US010717512B2

(12) United States Patent
Tyler et al.

(10) Patent No.: US 10,717,512 B2
(45) Date of Patent: Jul. 21, 2020

(54) COMPOSITE VEHICLE BODY

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

(*) Notice: Subject to any disclaimer, the term of this patent is extended or adjusted under 35 U.S.C. 154(b) by 512 days.

(21) Appl. No.: 15/682,826

(22) Filed: Aug. 22, 2017

(65) Prior Publication Data

US 2018/0118324 A1 May 3, 2018

Related U.S. Application Data

(60) Provisional application No. 62/417,056, filed on Nov. 3, 2016.

(51) Int. Cl.

*B64C 1/12* (2006.01)
*B29C 64/336* (2017.01)

(Continued)

(52) U.S. Cl.

CPC .............. *B64C 1/12* (2013.01); *B29C 64/106* (2017.08); *B29C 64/118* (2017.08); *B29C 64/165* (2017.08); *B29C 64/209* (2017.08); *B29C 64/336* (2017.08); *B29C 70/30* (2013.01); *B29C 70/382* (2013.01); *B29C 70/56* (2013.01); *B29D 99/001* (2013.01); *B32B 5/02* (2013.01); *B33Y 10/00* (2014.12); *B33Y 30/00* (2014.12); *B33Y 80/00* (2014.12); *B64C 1/06* (2013.01); *B64C 1/061* (2013.01); *B64C 1/08* (2013.01); *B64C 1/26* (2013.01); *B64C 3/18* (2013.01);

(Continued)

(58) Field of Classification Search

CPC ... B29C 70/56; B29L 2031/3085; B64C 1/08; B64C 3/52; B33Y 80/00; B32B 2605/18; Y10T 428/24992; Y10T 428/24083; Y10T 428/24124

See application file for complete search history.

(56) References Cited

U.S. PATENT DOCUMENTS 3,286,305 A 11/1966 Seckel
3,809,514 A 5/1974 Nunez (Continued)

FOREIGN PATENT DOCUMENTS

DE 4102257 A1 7/1992
EP 2589481 B1 1/2016

(Continued)

OTHER PUBLICATIONS

International Search Report dated Mar. 26, 2018 for PCT/US2017/059778 to CC3D LLC Filed Feb. 11, 2017.

(Continued)

*Primary Examiner* — Philip J Bonzell
*Assistant Examiner* — Michael B. Kreiner
(74) *Attorney, Agent, or Firm* — Ryan C. Stockett

(57) ABSTRACT

A vehicle body may have an internal skeleton, and a skin fabricated in-situ over the internal skeleton. The internal skeleton may be fabricated via a first additive manufacturing system. The skin may be fabricated via a second additive manufacturing system that is different from the first additive manufacturing system.

15 Claims, 8 Drawing Sheets

14 30 18 M F 28 27 F+M M F 26 16 20 22 24

(51) Int. Cl.

| | |
|---|---|
| ***B29C 70/38*** | (2006.01) |
| ***B29C 64/106*** | (2017.01) |
| ***B64C 1/06*** | (2006.01) |
| ***B64C 3/34*** | (2006.01) |
| ***B64C 1/08*** | (2006.01) |
| ***B29C 70/56*** | (2006.01) |
| ***B29D 99/00*** | (2010.01) |
| ***B32B 5/02*** | (2006.01) |
| ***B64C 3/26*** | (2006.01) |
| ***B33Y 80/00*** | (2015.01) |
| ***B64C 1/26*** | (2006.01) |
| ***B64F 5/10*** | (2017.01) |
| ***B29C 70/30*** | (2006.01) |
| ***B64C 3/18*** | (2006.01) |
| ***B64C 3/20*** | (2006.01) |
| ***B33Y 10/00*** | (2015.01) |
| ***B33Y 30/00*** | (2015.01) |
| ***B29C 64/118*** | (2017.01) |
| ***B29C 64/209*** | (2017.01) |
| ***B29C 64/165*** | (2017.01) |
| *B29L 31/30* | (2006.01) |
| *B29K 101/10* | (2006.01) |
| *B62D 29/04* | (2006.01) |
| *B64C 1/00* | (2006.01) |

(52) U.S. Cl.

CPC .................. *B64C 3/20* (2013.01); *B64C 3/26* (2013.01); *B64C 3/34* (2013.01); *B64F 5/10* (2017.01); *B29K 2101/10* (2013.01); *B29L 2031/30* (2013.01); *B29L 2031/3076* (2013.01); *B29L 2031/3085* (2013.01); *B32B 2307/50* (2013.01); *B32B 2605/18* (2013.01); *B62D 29/043* (2013.01); *B64C 3/182* (2013.01); *B64C 3/185* (2013.01); *B64C 3/187* (2013.01); *B64C 2001/0072* (2013.01)

(56) References Cited

U.S. PATENT DOCUMENTS

| | | | | |
|---|---|---|---|---|
| 3,984,271 | A | 10/1976 | Gilbu | |
| 3,993,726 | A | 11/1976 | Moyer | |
| 4,079,903 | A * | 3/1978 | Ashton | B64C 3/00 244/123.5 |
| 4,538,780 | A * | 9/1985 | Roe | B64C 3/20 244/123.5 |
| 4,643,940 | A | 2/1987 | Shaw et al. | |
| 4,671,761 | A | 6/1987 | Adrian et al. | |
| 4,822,548 | A | 4/1989 | Hempel | |
| 4,851,065 | A | 7/1989 | Curtz | |
| 5,002,712 | A | 3/1991 | Goldmann et al. | |
| 5,037,691 | A | 8/1991 | Medney et al. | |
| 5,296,335 | A | 3/1994 | Thomas et al. | |
| 5,340,433 | A | 8/1994 | Crump | |
| 5,440,193 | A | 8/1995 | Barrett | |
| 5,746,967 | A | 5/1998 | Hoy et al. | |
| 5,866,058 | A | 2/1999 | Batchelder et al. | |
| 5,936,861 | A | 8/1999 | Jang et al. | |
| 6,153,034 | A | 11/2000 | Lipsker | |
| 6,459,069 | B1 | 10/2002 | Rabinovich | |
| 6,501,554 | B1 | 12/2002 | Hackney et al. | |
| 6,799,081 | B1 | 9/2004 | Hale et al. | |
| 6,803,003 | B2 | 10/2004 | Rigali et al. | |
| 6,934,600 | B2 | 8/2005 | Jang et al. | |
| 7,039,485 | B2 | 5/2006 | Engelbart et al. | |
| 7,555,404 | B2 | 6/2009 | Brennan et al. | |
| 7,681,835 | B2 * | 3/2010 | Simpson | B64C 3/20 244/123.14 |
| 7,795,349 | B2 | 9/2010 | Bredt et al. | |
| 8,221,669 | B2 | 7/2012 | Batchelder et al. | |
| 8,962,717 | B2 | 2/2015 | Roth et al. | |
| 9,126,365 | B1 | 9/2015 | Mark et al. | |
| 9,126,367 | B1 | 9/2015 | Mark et al. | |
| 9,149,988 | B2 | 10/2015 | Mark et al. | |
| 9,156,205 | B2 | 10/2015 | Mark et al. | |
| 9,186,846 | B1 | 11/2015 | Mark et al. | |
| 9,186,848 | B2 | 11/2015 | Mark et al. | |
| 9,327,452 | B2 | 5/2016 | Mark et al. | |
| 9,327,453 | B2 | 5/2016 | Mark et al. | |
| 9,370,896 | B2 | 6/2016 | Mark | |
| 9,381,702 | B2 | 7/2016 | Hollander | |
| 9,457,521 | B2 | 10/2016 | Johnston et al. | |
| 9,458,955 | B2 | 10/2016 | Hammer et al. | |
| 9,527,248 | B2 | 12/2016 | Hollander | |
| 9,539,762 | B2 | 1/2017 | Durand et al. | |
| 9,579,851 | B2 | 2/2017 | Mark et al. | |
| 9,688,028 | B2 | 6/2017 | Mark et al. | |
| 9,694,544 | B2 | 7/2017 | Mark et al. | |
| 9,764,378 | B2 | 9/2017 | Peters et al. | |
| 9,770,876 | B2 | 9/2017 | Farmer et al. | |
| 9,782,926 | B2 | 10/2017 | Witzel et al. | |
| 10,076,876 | B2 * | 9/2018 | Mark | B29C 64/118 |
| 2002/0009935 | A1 | 1/2002 | Hsiao et al. | |
| 2002/0062909 | A1 | 5/2002 | Jang et al. | |
| 2002/0113331 | A1 | 8/2002 | Zhang et al. | |
| 2002/0165304 | A1 | 11/2002 | Mulligan et al. | |
| 2003/0044539 | A1 | 3/2003 | Oswald | |
| 2003/0056870 | A1 | 3/2003 | Comb et al. | |
| 2003/0146346 | A1 * | 8/2003 | Chapman, Jr. | B64F 5/10 244/123.3 |
| 2003/0160970 | A1 | 8/2003 | Basu et al. | |
| 2003/0186042 | A1 | 10/2003 | Dunlap et al. | |
| 2003/0236588 | A1 | 12/2003 | Jang et al. | |
| 2005/0006803 | A1 | 1/2005 | Owens | |
| 2005/0061422 | A1 | 3/2005 | Martin | |
| 2005/0104257 | A1 | 5/2005 | Gu et al. | |
| 2005/0109451 | A1 | 5/2005 | Hauber et al. | |
| 2005/0230029 | A1 | 10/2005 | Vaidyanathan et al. | |
| 2007/0003650 | A1 | 1/2007 | Schroeder | |
| 2007/0228592 | A1 | 10/2007 | Dunn et al. | |
| 2008/0176092 | A1 | 7/2008 | Owens | |
| 2009/0095410 | A1 | 4/2009 | Oldani | |
| 2010/0319838 | A1 | 12/2010 | Booher | |
| 2011/0032301 | A1 | 2/2011 | Fienup et al. | |
| 2011/0143108 | A1 | 6/2011 | Fruth et al. | |
| 2012/0060468 | A1 | 3/2012 | Dushku et al. | |
| 2012/0159785 | A1 | 6/2012 | Pyles et al. | |
| 2012/0164907 | A1 | 6/2012 | Restuccia et al. | |
| 2012/0231225 | A1 | 9/2012 | Mikulak et al. | |
| 2012/0247655 | A1 | 10/2012 | Erb et al. | |
| 2013/0149521 | A1 | 6/2013 | Nelson et al. | |
| 2013/0164498 | A1 | 6/2013 | Langone et al. | |
| 2013/0209600 | A1 | 8/2013 | Tow | |
| 2013/0233471 | A1 | 9/2013 | Kappesser et al. | |
| 2013/0292039 | A1 | 11/2013 | Peters et al. | |
| 2013/0337256 | A1 | 12/2013 | Farmer et al. | |
| 2013/0337265 | A1 | 12/2013 | Farmer | |
| 2014/0034214 | A1 | 2/2014 | Boyer et al. | |
| 2014/0061974 | A1 | 3/2014 | Tyler | |
| 2014/0159284 | A1 | 6/2014 | Leavitt | |
| 2014/0232035 | A1 | 8/2014 | Bheda | |
| 2014/0268604 | A1 | 9/2014 | Wicker et al. | |
| 2014/0291886 | A1 | 10/2014 | Mark et al. | |
| 2015/0136455 | A1 | 5/2015 | Fleming | |
| 2016/0012935 | A1 | 1/2016 | Rothfuss | |
| 2016/0031155 | A1 | 2/2016 | Tyler | |
| 2016/0046082 | A1 | 2/2016 | Fuerstenberg | |
| 2016/0052208 | A1 | 2/2016 | Debora et al. | |
| 2016/0082641 | A1 | 3/2016 | Bogucki et al. | |
| 2016/0082659 | A1 | 3/2016 | Hickman et al. | |
| 2016/0107379 | A1 | 4/2016 | Mark et al. | |
| 2016/0114532 | A1 | 4/2016 | Schirtzinger et al. | |
| 2016/0136885 | A1 | 5/2016 | Nielsen-Cole et al. | |
| 2016/0144565 | A1 | 5/2016 | Mark et al. | |
| 2016/0144566 | A1 | 5/2016 | Mark et al. | |
| 2016/0192741 | A1 | 7/2016 | Mark | |
| 2016/0200047 | A1 | 7/2016 | Mark et al. | |
| 2016/0243762 | A1 | 8/2016 | Fleming et al. | |
| 2016/0263806 | A1 | 9/2016 | Gardiner | |
| 2016/0263822 | A1 | 9/2016 | Boyd | |

(56) References Cited

U.S. PATENT DOCUMENTS

| | | | |
|---|---|---|---|
| 2016/0263823 | A1 | 9/2016 | Espiau et al. |
| 2016/0271876 | A1 | 9/2016 | Lower |
| 2016/0297104 | A1 | 10/2016 | Guillemette et al. |
| 2016/0311165 | A1 | 10/2016 | Mark et al. |
| 2016/0325491 | A1 | 11/2016 | Sweeney et al. |
| 2016/0332369 | A1 | 11/2016 | Shah et al. |
| 2016/0339633 | A1 | 11/2016 | Stolyarov et al. |
| 2016/0346998 | A1 | 12/2016 | Mark et al. |
| 2016/0361869 | A1 | 12/2016 | Mark et al. |
| 2016/0368213 | A1 | 12/2016 | Mark |
| 2016/0368255 | A1 | 12/2016 | Witte et al. |
| 2017/0007359 | A1 | 1/2017 | Kopelman et al. |
| 2017/0007360 | A1 | 1/2017 | Kopelman et al. |
| 2017/0007361 | A1 | 1/2017 | Boronkay et al. |
| 2017/0007362 | A1 | 1/2017 | Chen et al. |
| 2017/0007363 | A1 | 1/2017 | Boronkay |
| 2017/0007365 | A1 | 1/2017 | Kopelman et al. |
| 2017/0007366 | A1 | 1/2017 | Kopelman et al. |
| 2017/0007367 | A1 | 1/2017 | Li et al. |
| 2017/0007368 | A1 | 1/2017 | Boronkay |
| 2017/0007386 | A1 | 1/2017 | Mason et al. |
| 2017/0008333 | A1 | 1/2017 | Mason et al. |
| 2017/0015059 | A1 | 1/2017 | Lewicki |
| 2017/0015060 | A1 | 1/2017 | Lewicki et al. |
| 2017/0021565 | A1 | 1/2017 | Deaville |
| 2017/0028434 | A1 | 2/2017 | Evans et al. |
| 2017/0028588 | A1 | 2/2017 | Evans et al. |
| 2017/0028617 | A1 | 2/2017 | Evans et al. |
| 2017/0028619 | A1 | 2/2017 | Evans et al. |
| 2017/0028620 | A1 | 2/2017 | Evans et al. |
| 2017/0028621 | A1 | 2/2017 | Evans et al. |
| 2017/0028623 | A1 | 2/2017 | Evans et al. |
| 2017/0028624 | A1 | 2/2017 | Evans et al. |
| 2017/0028625 | A1 | 2/2017 | Evans et al. |
| 2017/0028627 | A1 | 2/2017 | Evans et al. |
| 2017/0028628 | A1 | 2/2017 | Evans et al. |
| 2017/0028633 | A1 | 2/2017 | Evans et al. |
| 2017/0028634 | A1 | 2/2017 | Evans et al. |
| 2017/0028635 | A1 | 2/2017 | Evans et al. |
| 2017/0028636 | A1 | 2/2017 | Evans et al. |
| 2017/0028637 | A1 | 2/2017 | Evans et al. |
| 2017/0028638 | A1 | 2/2017 | Evans et al. |
| 2017/0028639 | A1 | 2/2017 | Evans et al. |
| 2017/0028644 | A1 | 2/2017 | Evans et al. |
| 2017/0030207 | A1 | 2/2017 | Kittleson |
| 2017/0036403 | A1 | 2/2017 | Ruff et al. |
| 2017/0050340 | A1 | 2/2017 | Hollander |
| 2017/0057164 | A1 | 3/2017 | Hemphill et al. |
| 2017/0057165 | A1 | 3/2017 | Waldrop et al. |
| 2017/0057167 | A1 | 3/2017 | Tooren et al. |
| 2017/0057181 | A1 | 3/2017 | Waldrop et al. |
| 2017/0064840 | A1 | 3/2017 | Espalin et al. |
| 2017/0066187 | A1 | 3/2017 | Mark et al. |
| 2017/0087768 | A1 | 3/2017 | Bheda |
| 2017/0106565 | A1 | 4/2017 | Braley et al. |
| 2017/0120519 | A1 | 5/2017 | Mark |
| 2017/0129170 | A1 | 5/2017 | Kim et al. |
| 2017/0129171 | A1 | 5/2017 | Gardner et al. |
| 2017/0129176 | A1 | 5/2017 | Waatti et al. |
| 2017/0129182 | A1 | 5/2017 | Sauti et al. |
| 2017/0129186 | A1 | 5/2017 | Sauti et al. |
| 2017/0144375 | A1 | 5/2017 | Waldrop et al. |
| 2017/0151728 | A1 | 6/2017 | Kunc et al. |
| 2017/0157828 | A1 | 6/2017 | Mandel et al. |
| 2017/0157831 | A1 | 6/2017 | Mandel et al. |
| 2017/0157844 | A1 | 6/2017 | Mandel et al. |
| 2017/0157851 | A1 | 6/2017 | Nardiello et al. |
| 2017/0165908 | A1 | 6/2017 | Pattinson et al. |
| 2017/0173868 | A1 | 6/2017 | Mark |
| 2017/0182712 | A1 | 6/2017 | Scribner et al. |
| 2017/0210074 | A1 | 7/2017 | Ueda et al. |
| 2017/0217088 | A1 | 8/2017 | Boyd et al. |
| 2017/0232674 | A1 | 8/2017 | Mark |
| 2017/0259502 | A1 | 9/2017 | Chapiro et al. |
| 2017/0259507 | A1 | 9/2017 | Hocker |
| 2017/0266876 | A1 | 9/2017 | Hocker |
| 2017/0274585 | A1 | 9/2017 | Armijo et al. |
| 2017/0284876 | A1 | 10/2017 | Moorlag et al. |

FOREIGN PATENT DOCUMENTS

| | | | |
|---|---|---|---|
| EP | 3219474 | A1 | 9/2017 |
| KR | 100995983 | B1 | 11/2010 |
| KR | 101172859 | B1 | 8/2012 |
| WO | 2008147754 | A1 | 12/2008 |
| WO | 2013017284 | A2 | 2/2013 |
| WO | 2016088042 | A1 | 6/2016 |
| WO | 2016088048 | A1 | 6/2016 |
| WO | 2016110444 | A1 | 7/2016 |
| WO | 2016159259 | A1 | 10/2016 |
| WO | 2016196382 | A1 | 12/2016 |
| WO | 2017006178 | A1 | 1/2017 |
| WO | 2017006324 | A1 | 1/2017 |
| WO | 2017051202 | A1 | 3/2017 |
| WO | 2017081253 | A1 | 5/2017 |
| WO | 2017085649 | A1 | 5/2017 |
| WO | 2017087663 | A1 | 5/2017 |
| WO | 2017108758 | A1 | 6/2017 |
| WO | 2017122941 | A1 | 7/2017 |
| WO | 2017122942 | A1 | 7/2017 |
| WO | 2017122943 | A1 | 7/2017 |
| WO | 2017123726 | A1 | 7/2017 |
| WO | 2017124085 | A1 | 7/2017 |
| WO | 2017126476 | A1 | 7/2017 |
| WO | 2017126477 | A1 | 7/2017 |
| WO | 2017137851 | A2 | 8/2017 |
| WO | 2017142867 | A1 | 8/2017 |
| WO | 2017150186 | A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

(56) References Cited

OTHER PUBLICATIONS

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

COMPOSITE VEHICLE BODY

RELATED APPLICATIONS

This application is based on and claims the benefit of priority from U.S. Provisional Application No. 62/417,056 that was filed on Nov. 3, 2016, the contents of which are expressly incorporated herein by reference.

TECHNICAL FIELD

The present disclosure relates generally to a vehicle body and, more particularly, to a vehicle body made from a composite material.

BACKGROUND

A vehicle body (e.g., an airplane body, a car body, or a boat body) generally includes an internal skeleton that gives shape to the vehicle, and a skin that overlays the skeleton and provides a smooth outer surface. Modern vehicle bodies are fabricated from a combination of different materials, including composites. For example, the skeleton is typically made of wood, aluminum, or stainless steel, while the skin is typically made of a fiber (e.g., a carbon fiber or fiberglass) embedded within a resin matrix.

Pultrusion is a common way to manufacture straight skeletal parts of a vehicle body (e.g., beams, longerons, etc.). During pultrusion manufacturing, individual fiber strands, braids of strands, and/or woven fabrics are pulled from corresponding spools through a resin bath and through a stationary die. The resin is then allowed to cure and harden. Due to the pulling of the fibers prior to curing, some of the fibers may retain a level of tensile stress after curing is complete. This tensile stress can increase a strength of the skeletal part in the direction in which the fibers were pulled.

A vacuum-assisted resin transfer molding (VARTM) process is commonly used to fabricate the skin of the vehicle body, after the internal skeleton has already been formed. In a VARTM process, sheets of fibrous material are manually pulled over the internal skeleton and then tacked in place. The tacked material is then manually coated with a liquid matrix (e.g., a thermoset resin or a heated thermoplastic), covered with a vacuum bag to facilitate impregnation of the liquid matrix, and allowed to cure and harden.

Although pultrusion manufacturing and VARTM can be an acceptable ways to produce vehicle body parts in some situations, they can also be problematic. In particular, the VARTM-produced skin is often attached to the pultruded skeletal parts and/or reinforced via metallic fasteners (e.g., screws, rivets, and clips). The use of metallic fasteners can drive skeletal design and increase a weight and cost of the vehicle body. In addition, the various vehicle body parts may need to be joined to each other via specially designed hardware, which can also be heavy and costly. Further, electronics (e.g., sensors, heaters, electrical leads, etc.) may need to be added to the vehicle bodies after manufacture, which can further increase the weight, cost, and unreliability. Finally, conventional pultrusion and VARTM manufacturing processes may provide little flexibility in the design and/or use of the vehicle body.

The disclosed composite vehicle body is directed to overcoming one or more of the problems set forth above and/or other problems of the prior art.

SUMMARY

In one aspect, the present disclosure is directed to a vehicle body. The vehicle body may include an internal skeleton, and a skin fabricated in-situ over the internal skeleton. The internal skeleton may be fabricated via a first additive manufacturing system. The skin may be fabricated via a second additive manufacturing system that is different from the first additive manufacturing system.

In another aspect, the present disclosure is directed to another vehicle body. This vehicle body may include an internal skeleton having a plurality of adjacent hollow tubes extending in a length direction of the wing and being formed from a plurality of continuous fibers coated with a matrix. The vehicle body may also include a skin having a plurality of continuous fibers coated with a matrix and laid over the internal skeleton. The plurality of continuous fibers of both the internal skeleton and the skin may be in tension, and at least one of the plurality of adjacent hollow tubes may be coated to function as at least one of a fuel tank and a fuel passage.

In another aspect, the present disclosure is directed to a method of fabricating a vehicle body. The method may include implementing a first additive manufacturing technique to fabricate an internal skeleton from continuous fibers coated with a matrix. The method may also include implementing a second additive manufacturing technique to fabricate a skin over the internal skeleton from continuous fibers coated with a matrix.

DETAILED DESCRIPTION

Figure 1:
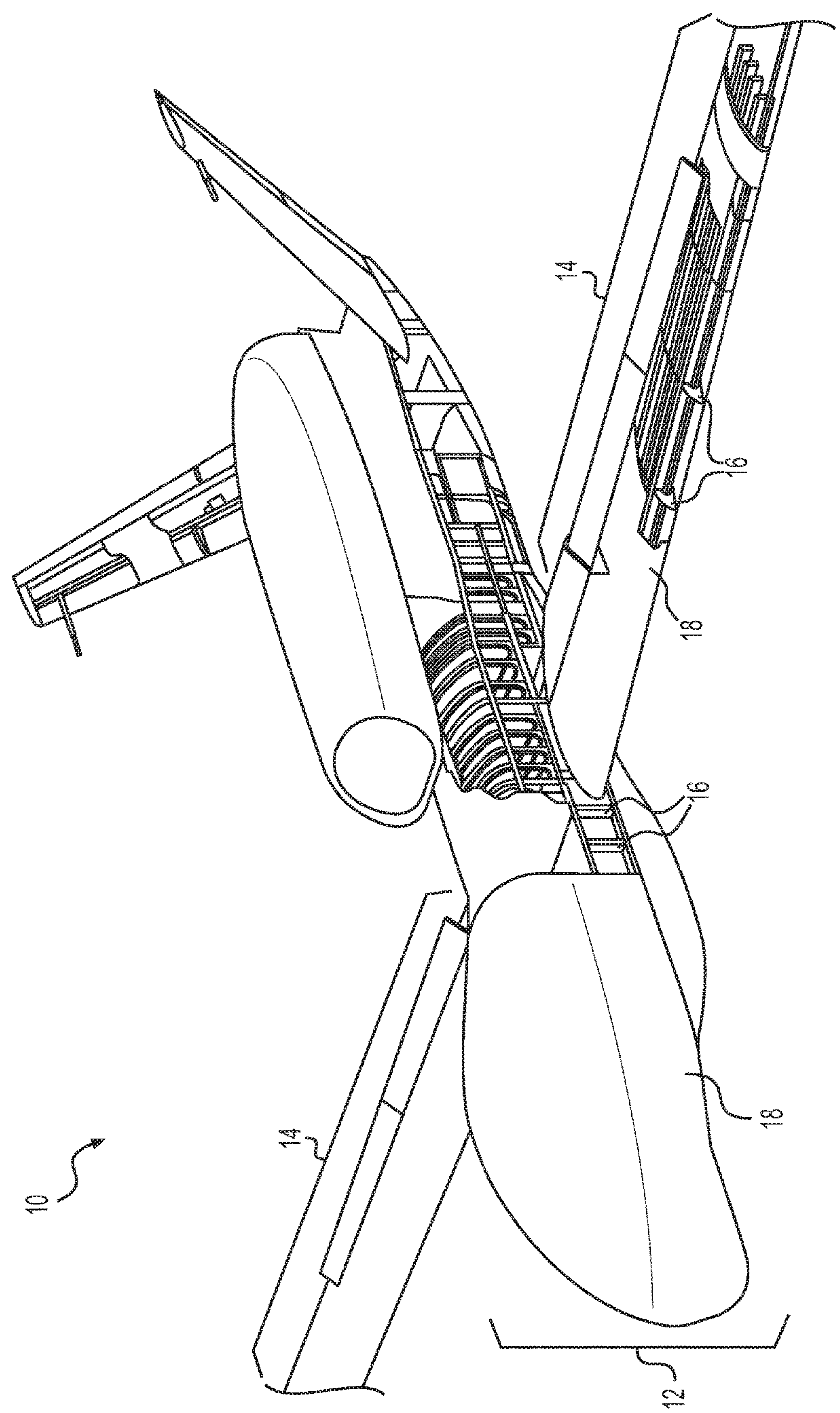
FIG. 1 is a diagrammatic illustration of an exemplary vehicle body.

FIG. 1 illustrates an exemplary vehicle body ("body") 10. In the disclosed embodiment, body 10 is an aircraft body (e.g., an airplane body or a drone body). It is contemplated, however, that body 10 could be of another type (e.g., a car body, a boat body, etc.), if desired. Body 10, regardless of its configuration and intended use, may include one or more components (e.g., a fuselage 12, one or more wings 14, etc.) made from an internal skeleton (e.g., spars, ribs, stringers, bulkheads, trusses, longerons, etc.) 16 covered by an external skin 18. In some embodiments, the components of body 10 may be fabricated separately and subsequently joined together (e.g., via threaded fastening, riveting, etc.). In other embodiments, the body components may be fabricated together as an integral monolithic structure (e.g., a structure that cannot be disassembled without at least some destruction).

Figure 2:
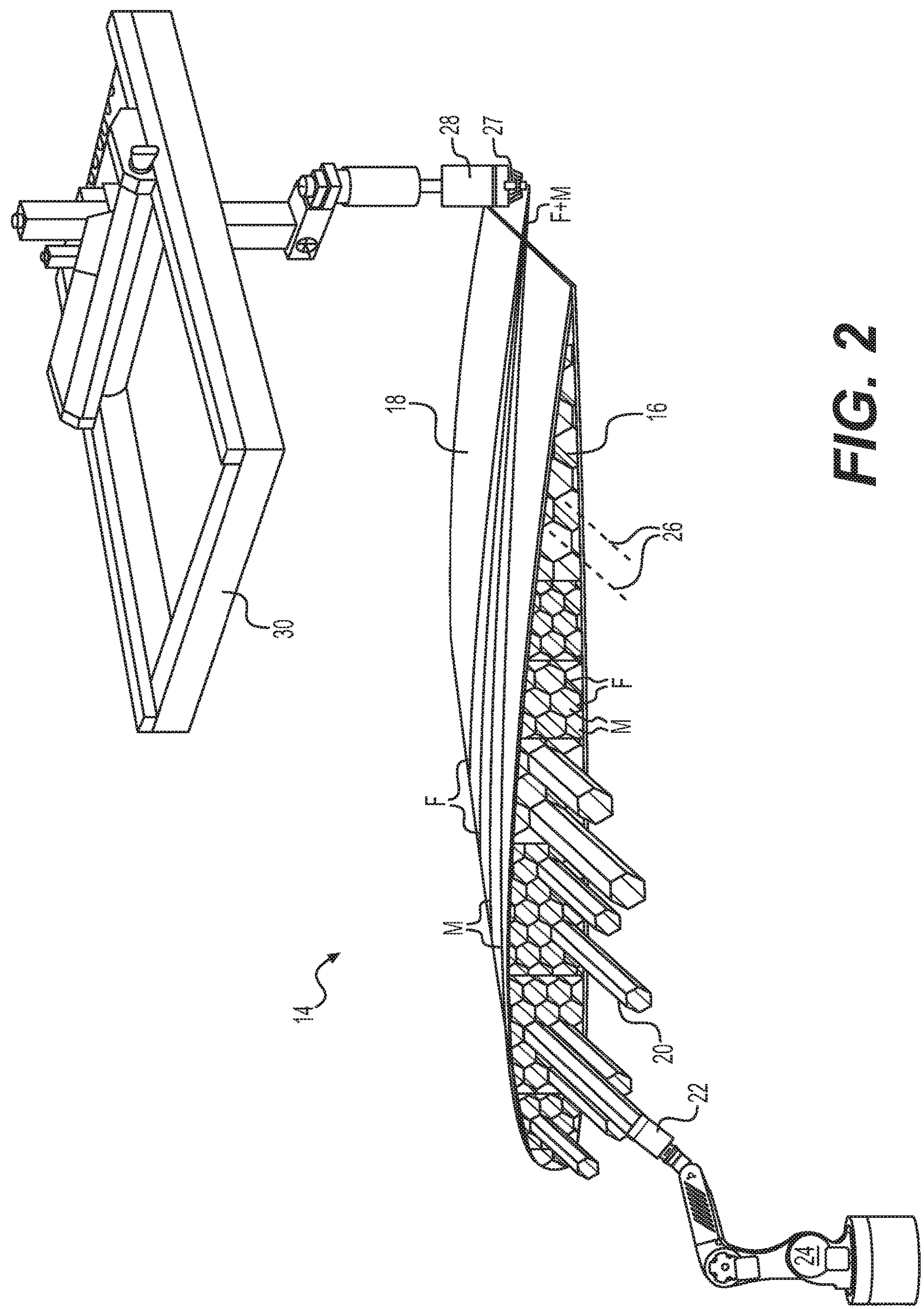
FIG. 2-5 are diagrammatic illustrations of exemplary portions of the vehicle body of FIG. 1 during manufacture.

As shown in FIG. 2, one or more of the components of body 10 may be fabricated via an additive manufacturing process. For example, skeleton 16 may be fabricated from a first additive manufacturing process, while skin 18 may be manufactured from a second and different additive manufacturing process. It is contemplated that both skeleton 16 and skin 18 could be manufactured from the same additive manufacturing process, if desired.

The first additive manufacturing process may be a pultrusion and/or extrusion process that creates hollow tubular structures 20 from a composite material (e.g., a material having a matrix M and at least one continuous fiber F). In particular, one or more heads 22 may be coupled to a support 24 (e.g., to a robotic arm) that is capable of moving head(s) 22 in multiple directions during discharge of structures 20, such that resulting longitudinal axes 26 of structures 20 are three-dimensional. Such a head is disclosed, for example, in U.S. patent application Ser. Nos. 13/975,300 and 15/130,207 and in PCT Application Number 2016042909, all of which are incorporated herein in their entireties by reference.

Head(s) 22 may be configured to receive or otherwise contain the matrix material M. The matrix material M may include any type of liquid resin (e.g., a zero volatile organic compound resin) that is curable. Exemplary resins include epoxy resins, polyester resins, cationic epoxies, acrylated epoxies, urethanes, esters, thermoplastics, photopolymers, polyepoxides, thermoset acrylates, thermosets, bismaleimides, silicon, and more. In one embodiment, the pressure of the matrix material M inside of head(s) 22 may be generated by an external device (e.g., an extruder or another type of pump) that is fluidly connected to head(s) 22 via corresponding conduits (not shown). In another embodiment, however, the pressure may be generated completely inside of head(s) 22 by a similar type of device and/or simply be the result of gravity acting on the matrix material M. In some instances, the matrix material M inside head(s) 22 may need to be kept cool and/or dark in order to inhibit premature curing; while in other instances, the matrix material M may need to be kept warm for the same reason. In either situation, head(s) 22 may be specially configured (e.g., insulated, chilled, and/or warmed) to provide for these needs.

The matrix material M stored inside head(s) 22 may be used to coat any number of continuous fibers F and, together with the fibers F, make up walls of composite structures 20. The fibers F may include single strands, a tow or roving of several strands, or a weave of many strands. The strands may include, for example, carbon fibers, vegetable fibers, wood fibers, mineral fibers, glass fibers, metallic wires, SiC Ceramic fibers, basalt fibers, etc. The fibers F may be coated with the matrix material M while the fibers F are inside head(s) 22, while the fibers F are being passed to head(s) 22, and/or while the fibers F are discharging from head(s) 22, as desired. In some embodiments, a filler material (e.g., chopped fibers) may be mixed with the matrix material M before and/or after the matrix material M coats the fibers F. The matrix material, the dry fibers, fibers already coated with the matrix material M, and/or the filler may be transported into head(s) 22 in any manner apparent to one skilled in the art. The matrix-coated fibers F may then pass over a centralized diverter (not shown) located at a mouth of head(s) 22, where the resin is caused to cure (e.g., from the inside-out, from the outside-in, or both) by way of one or more cure enhancers (e.g., UV lights and/or ultrasonic emitters) 27.

In the example of FIG. 2, structures 20 extend in a length direction of wing 14 and makeup at least a portion of skeleton 16. Each structure 20 may be discharged adjacent another structure 20 and/or overlap a previously discharged structure 20, and subsequently cured such that the liquid resin within neighboring structures 20 bonds together. Any number of structures 20 may be grouped together and have any trajectory required to generate the desired skeletal shape of wing 14.

In some embodiments, a fill material (e.g., an insulator, a conductor, an optic, a surface finish, etc.) could be deposited inside and/or outside of structures 20 while structures 20 are being formed. For example, a hollow shaft (not shown) could extend through a center of and/or over any of the associated head(s) 22. A supply of material (e.g., a liquid supply, a foam supply, a solid supply, a gas supply, etc.) could then be connected with an end of the hollow shaft, and the material forced through the hollow shaft and onto particular surfaces (i.e., interior and/or exterior surfaces) of structure 20. It is contemplated that the same cure enhancer(s) 27 used to cure structure 20 could also be used to cure the fill material, if desired, or that additional dedicated cure enhancer(s) (not shown) could be used for this purpose. The fill materials could allow one or more of structures 20 to function as fuel tanks, fuel passages, electrical conduits, ventilation ducts, etc.

The second additive manufacturing process used to fabricate the exemplary wing 14 of FIG. 2 may also be a pultrusion and/or extrusion process. However, instead of creating hollow tubular structures 20, the second additive manufacturing process may be used to discharge tracks, ribbons, and/or sheets of composite material over tubular structures 20 (and/or over other features of skeleton 16) to thereby fabricate skin 18. In particular, one or more heads 28 may be coupled to a support 30 (e.g., to an overhead gantry) that is capable of moving head(s) 28 in multiple directions during fabrication of skin 18, such that resulting contours of skin 18 are three-dimensional.

Head 28 may be similar to head 22 and configured to receive or otherwise contain a matrix material M (e.g., the same matrix material M contained within head 22). The matrix material M stored inside head(s) 28 may be used to coat any number of separate fibers F, allowing the fibers F to make up centralized reinforcements of the discharging tracks, ribbons, and/or sheets. The fibers F may include single strands, a tow or roving of several strands, or a weave of multiple strands. The strands may include, for example, carbon fibers, vegetable fibers, wood fibers, mineral fibers, glass fibers, metallic wires, etc. The fibers F may be coated with the matrix material M while the fibers F are inside head(s) 28, while the fibers F are being passed to head(s) 28, and/or while the fibers F are discharging from head(s) 28, as desired. The matrix material, the dry fibers, and/or fibers already coated with the matrix material may be transported into head(s) 28 in any manner apparent to one skilled in the art. The matrix-coated fibers F may then pass through one or more circular orifices, rectangular orifices, triangular orifices, or orifices of another curved or polygonal shape, where the fibers F are pressed together and the resin is caused to cure by way of one or more cure enhancers 27.

Figure 3:
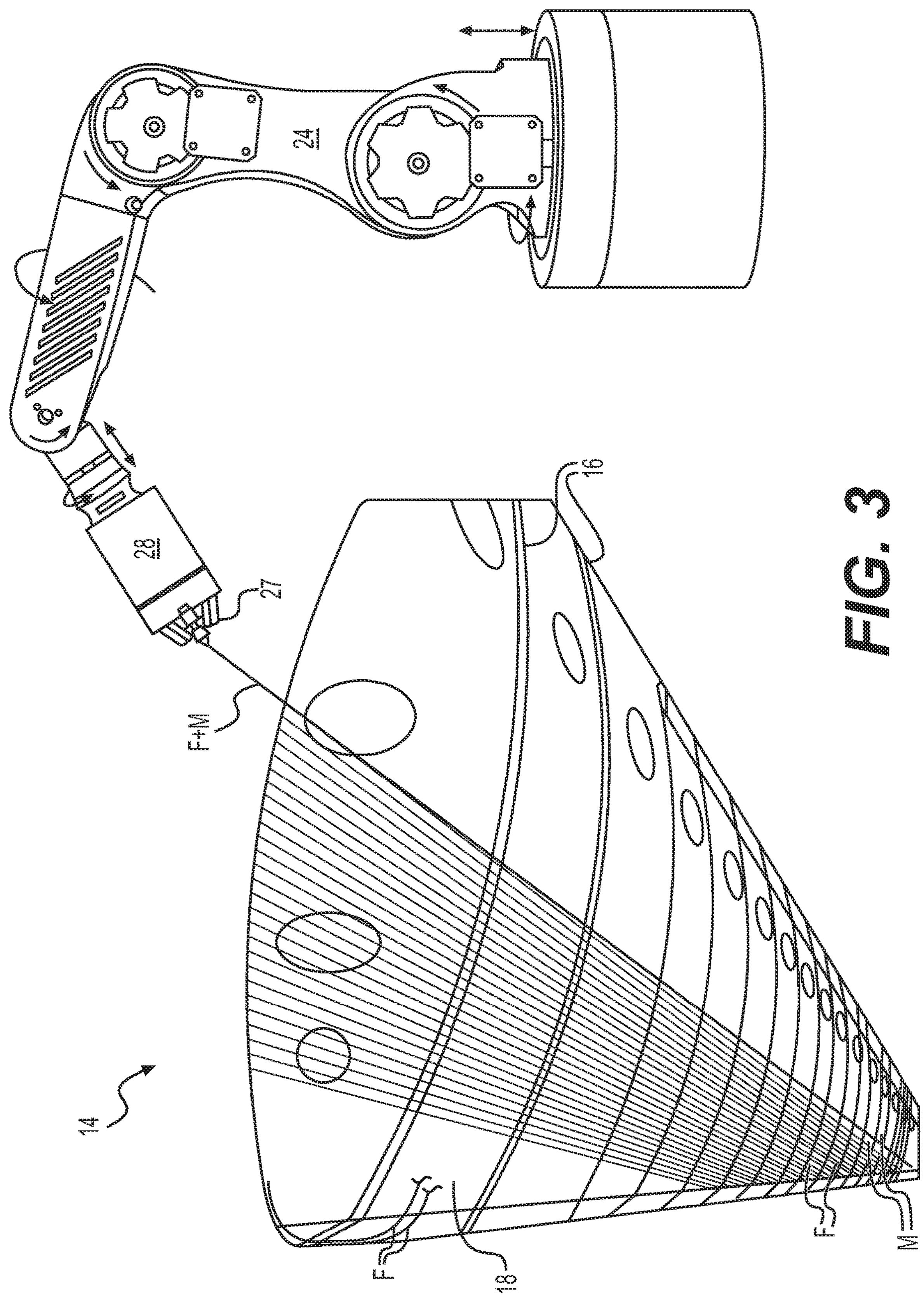

In another exemplary embodiment shown in FIG. 3, only a single additive manufacturing process is being used to fabricate wing 14. In particular, the second manufacturing process described above is being used to additively build up layers of skeleton 16 (e.g., of spars and/or stringers) with continuous fibers F and matrix material M and to cover skeleton 16 with additively built up layers of skin 18 of the same or different continuous fibers F and matrix material M. The fibers F making up skeleton 16 may continue over an outer surface of skeleton 16 to become part of skin 18, such that a continuous mechanical connection is formed between skeleton 16 and skin 18 by the continuous fibers F. In this way, the number of fasteners required to connect skin 18 to skeleton 16 may be reduced (if not eliminated). It is contemplated that support 24 and/or support 30 may be used to move any number of heads 28 during fabrication of wing 14 (or during fabrication of any other component of body 10).

As described above, the first and second additive manufacturing processes can be extrusion or pultrusion processes. For example, extrusion may occur when the liquid resin matrix M and the associated continuous fibers F are pushed from head(s) 22 and/or head(s) 28 during the movement of supports 24 and/or 30. Pultrusion may occur after a length of resin-coated fibers is connected to an anchor (not shown) and cured, followed by movement of head(s) 22 and/or heads (28) away from the anchor. The movement of head(s) 22 and/or head(s) 28 away from the anchor causes the fibers F to be pulled from the respective head(s) along with the coating of the matrix material M.

In some embodiments, pultrusion may be selectively implemented to generate tension in the fibers F that make up skeleton 16 and/or skin 18 and that remains after curing. In particular, as the fibers F are being pulled from the respective head(s), the fibers F may be caused to stretch. This stretching can create tension within the fibers F. As long as the matrix M surrounding the fibers F cures and hardens while the fibers F are stretched, at least some of this tension remains in the fibers F and functions to increase a strength of the resulting composite structure.

Structures fabricated via conventional pultrusion methods may have increased strength in only a single direction (e.g., in the one direction in which fibers were pulled through the corresponding die prior to manual resin impregnation and curing). However, in the disclosed embodiment, the increased strength in the skeleton 16 and/or skin 18 of body 10 (e.g., within wing 14) caused by residual tension within the corresponding fibers F may be realized in the axial direction of each the fibers F. And because each fiber F could be pulled in a different direction when being discharged by head(s) 22 and/or 28, the tension-related strength increase may be realized in multiple (e.g., innumerable) different directions.

Structures fabricated via conventional pultrusion methods may have strength increased to only a single level (e.g., to a level proportionate to an amount in which the fibrous cloth was stretched by the pulling machine prior to manual resin impregnation and curing). However, in the disclosed embodiment, because the matrix M surrounding each fiber F may be cured and harden immediately upon discharge, the force pulling on the fiber F may be continuously varied along the length of the fiber F, such that different segments of the same fiber F are stretched by different amounts. Accordingly, the tensile stress induced within each of the different segments of each fiber F may also be different, resulting in a variable strength within the different segments of skeleton 16 and/or skin 18 of body 10. This may be beneficial in variably loaded areas of body 10 (e.g., at the intersection of wing 14 and fuselage 12, within a center of wing 14, at the leading edge of wing 14, etc.).

Figure 4:
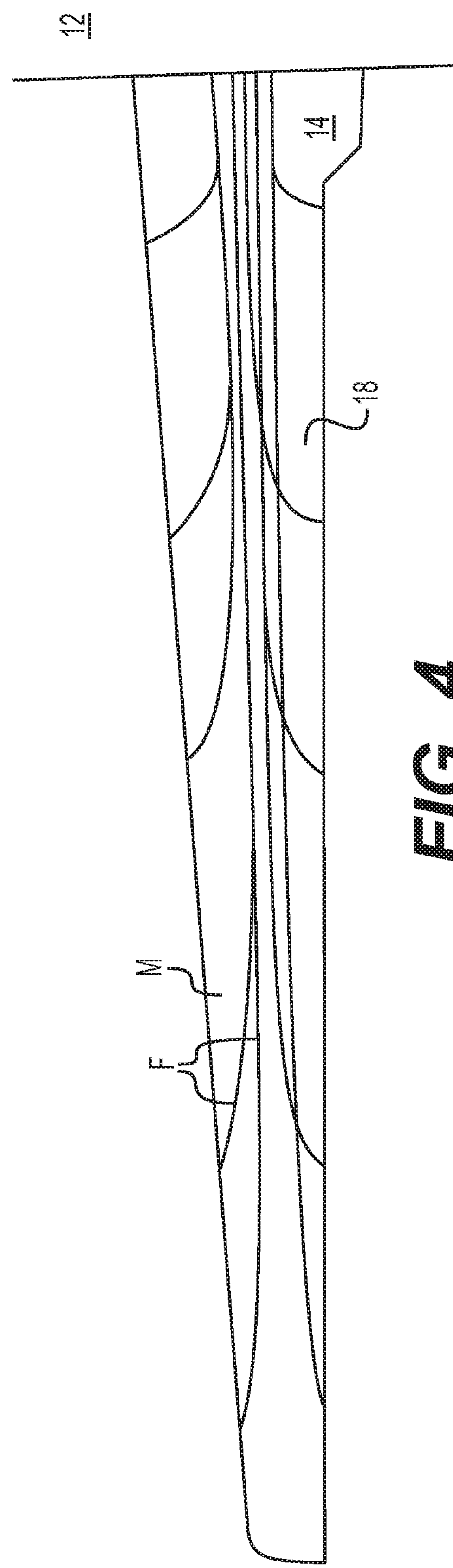

FIG. 4 illustrates an exemplary way in which the fibers F of skin 18 can be arranged to provide for desired characteristics of wing 14. In this example, the fibers F are arranged organically (e.g., in the way that a tree grows or in the way that blood veins are situated in the body). Specifically, the fibers F placed over structure 16 of wing 14 may be anchored at an intersection with fuselage 12 and in a general fore/aft center. The fibers F may then be pulled toward a distal tip of wing 14, and away from the fore/aft center (e.g., toward a leading or trailing edge of wing 14), with different fibers F extending different distances toward the distal tip. In addition, because the discharging matrix material M may cure immediately upon discharge from head 28 and bond to either structure 16 or previously discharged layers of skin 18, movement of head 28 during discharge may be controlled to create trajectories of the fibers F that curve. It is contemplated that the fibers F may pass completely around wing 14 at its distal termination point, and then be pulled back toward fuselage 12 following a mirror image of its initial trajectory. This arrangement of organically arranged fibers may be located at a top side of wing 14, at a lower side, and/or around a cross-sectional perimeter of wing 14 at multiple locations. With this arrangement, a greater density of fibers F may exist near fuselage 12 than near the distal tip of wing 14. Accordingly, wing 14 may be thicker near fuselage 12 and near the general fore/aft center, and taper toward the distal tip and the leading and trailing edges. Other arrangements and/or fiber distribution schemes may be employed, as desired.

Figure 5:
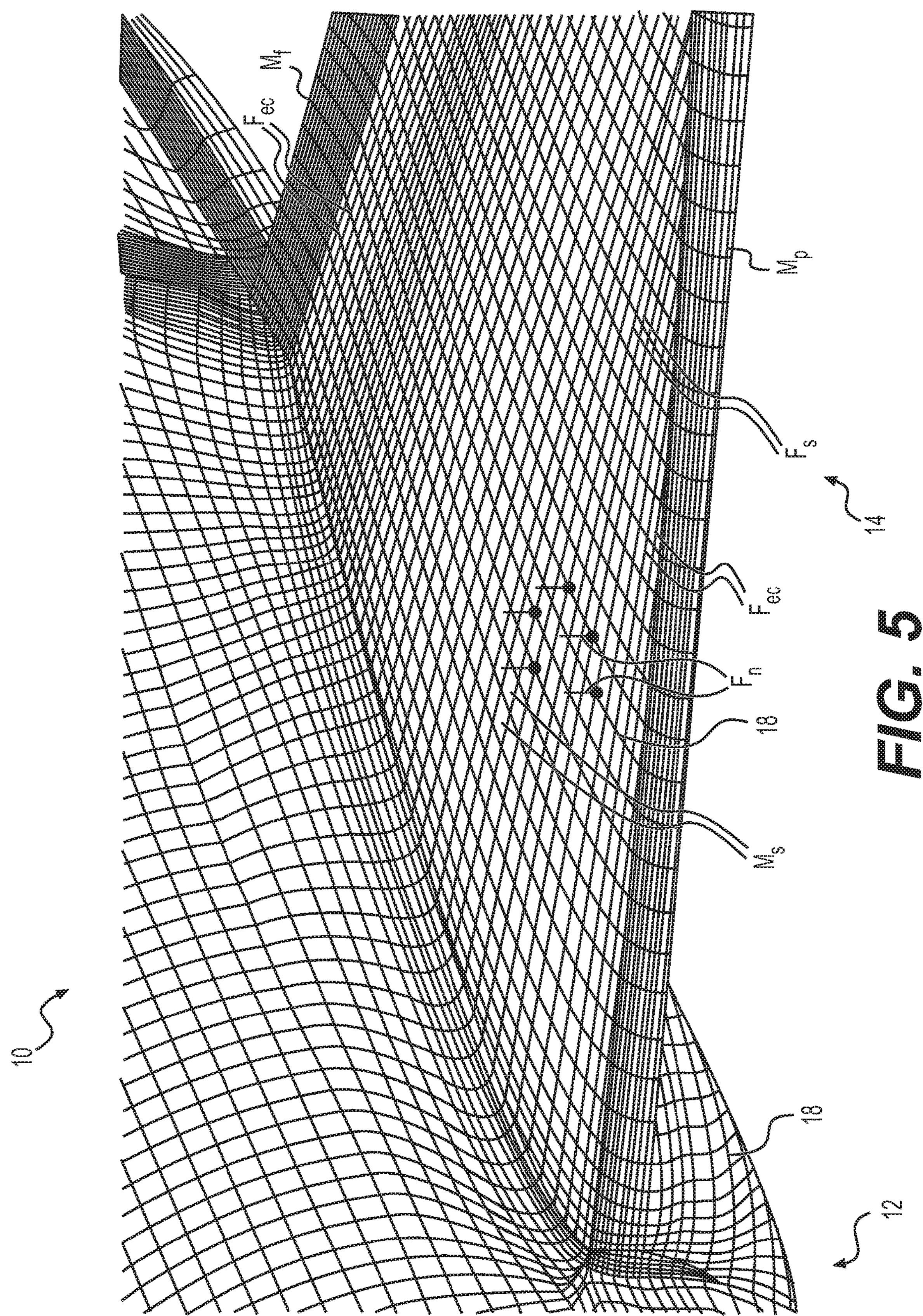
Figure 6:
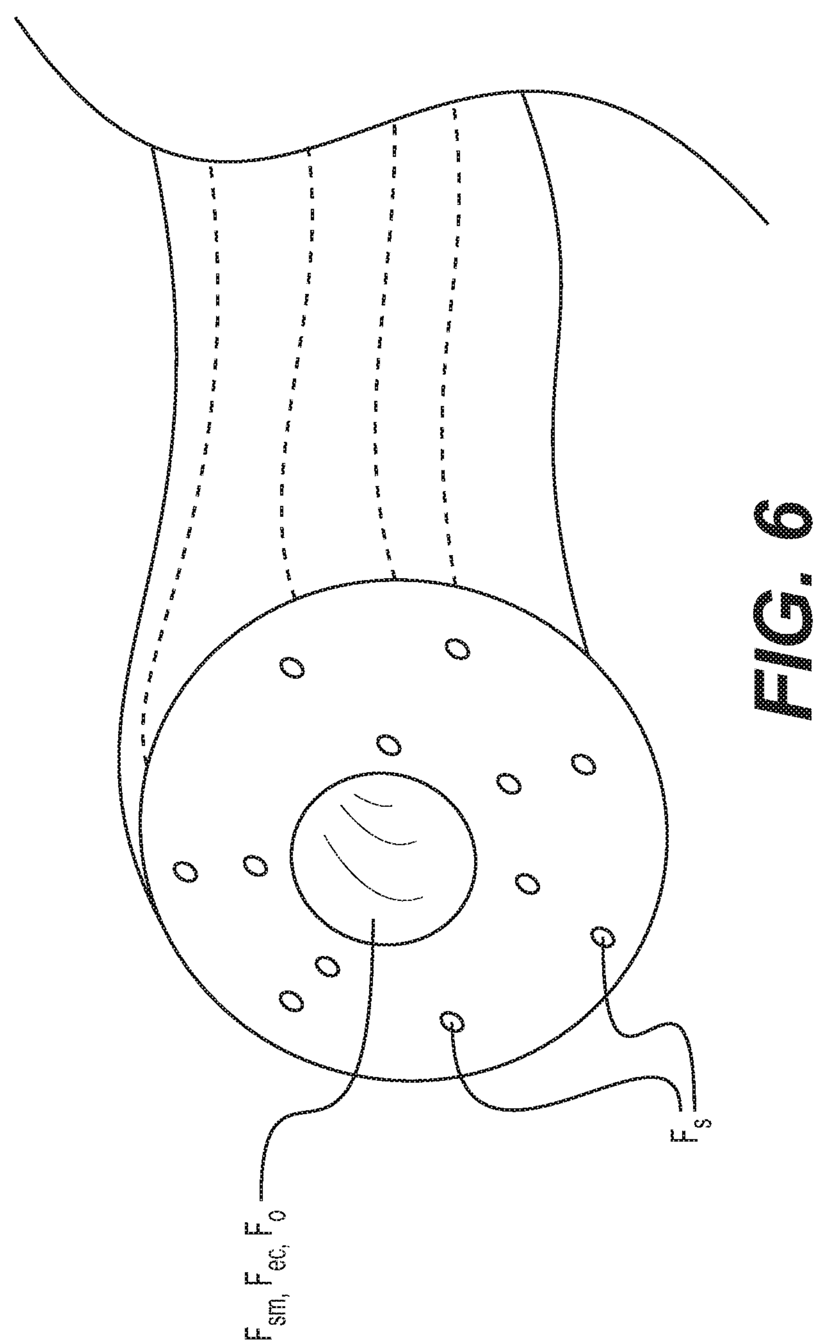
FIG. 6 is a cross-sectional illustration of an exemplary fiber that may be used to fabricate the vehicle body of FIG. 1.

In one exemplary embodiment shown in FIG. 5, some of the fibers F within the composite material making up one or more portions of body 10 have unique characteristics. For example, while a majority of wing 14 may comprise a structural type fiber $F_s$ (e.g., carbon fibers, fiberglass, or Kevlar fibers), some portions of wing 14 may include another type of fiber F (e.g., electrically conductive fibers $F_{ec}$, optical fibers $F_o$, shape memory fibers $F_{sm}$, etc.). The other type of fibers F may be selectively interwoven with the structural type fibers $F_s$ at strategic locations. For example, electrically conductive fibers $F_{ec}$ may be located at leading edges and/or thinner portions of wing 14 and used as heating electrodes that can be connected to a power source and used to remove ice from wing 14. Alternative, electrically conductive fibers $F_{ec}$ may be located at high-stress regions (e.g., at the intersection of wing 14 and fuselage 12) and used as strain gauges to detect loading of body 10. In a similar manner optical fibers $F_o$ may be located at high-stress regions and an energy beam passed therethrough. As body 10 flexes, the optical fibers $F_o$ may be squeezed and/or closed, thereby generating an optical feedback signal indicative of the flexing. In yet another embodiment, fibers $F_{sm}$ fabricated from a shape memory alloy (e.g., Nitonol) may be interwoven with the structural type fibers $F_s$ and selectively energized (e.g., via electricity or heat) to cause flexing (e.g., controlled pulling and/or pushing) of body 10 that results in a desired aerodynamic performance (e.g., steering, orientation, elevation control, stability, drag, etc.). As shown in FIG. 6, it is contemplated that the electrically conductive fibers $F_{ec}$, the optical fibers $F_o$, and/or the shape memory fibers $F_{sm}$ may be coated with another material (e.g., insulation, a strength enhancing layer, etc.), if desired. It is also contemplated that other electrical components (e.g., resistors, capacitors, etc.) may be extruded through heads 22, 28 and/or automatically picked-and-placed (e.g., via attachments associated with heads 22 and/or 28) during discharge of fibers $F_{ec}$, fibers $F_o$, and/or fibers $F_{sm}$. Operation of these components and/or of fibers $F_{ec}$, fibers $F_o$, and/or fibers $F_{sm}$ may be selectively tuned in these instances, for example by adjusting a shape, tension, and/or size of the fibers.

Structures fabricated via conventional pultrusion and/or extrusion methods may be limited in the orientation of the associated fibers. That is, the fibers may be generally overlapping and lie in parallel layers. However, in the embodiment illustrated in FIG. 5, because the matrix M surrounding each fiber F may be cured and harden immediately upon discharge, the fibers F may be caused to extend into free space without additional support. That is, the fibers F may not be required to lie in flat layers on top of each other. Accordingly, the fibers F making up skeleton 16 and/or skin 18 may be oriented in directions that are perpendicular to each other in three dimensions. For example, FIG. 5 illustrates fibers $F_n$ that extend in a direction normal to the surface of wing 14. This may allow for interlocking of fiber layers and/or for the creation of unique (e.g., turbulence enhancing) surface textures.

As described above and shown in FIG. 5, body 10 may be fabricated as an integral monolithic structure, in some embodiments. For example, wings 14 may be fabricated together with (e.g., at the same time as and without separation from) fuselage 12. In particular, as support(s) 24 and/or 30 move any number of head(s) 28 over skeleton 16 to create skin 18 (referring to FIG. 2), head(s) 28 may pass from one wing 14, over or under fuselage 12, and continue across the opposing wing 14. In this instance, the fibers F discharging from head(s) 28 may be continuous over wings 14 and fuselage 12. This process may be repeated any number of times, such that millions (if not hundreds of millions) of fibers F extend through the intersection between wings 14 and fuselage 12, thereby creating a strong mechanical connection without requiring the use of specialized hardware and/or heavy fasteners.

In the exemplary embodiment shown in FIG. 5, the matrix M within the composite material making up one or more portions of body 10 has unique characteristics. For example, while a majority of wing 14 may comprise a structural type matrix $M_s$ (e.g., a conventional UV curable liquid resin such as an acrylated epoxy), some portions of wing 14 may include another type of matrix M (e.g., a pyrolized matrix $M_p$, a matrix that remains somewhat flexible $M_f$, etc.). The other type of matrix M may be selectively used to coat the fibers F at strategic locations. For example, the pyrolized matrix $M_p$ may be fed into head 28 as head 28 nears the leading edge of wing 14 and/or a nose of fuselage 12, such that the resulting composite material may function as a heat shield in these areas. In another example, the flexible matrix $M_f$ may be fed into head 28 as head 28 nears the trailing edge of wing 14 (e.g., where the shape memory fibers $F_{sm}$ are placed, such that the resulting composite material may be more flexible and selectively warped or twisted to provide for the desired aerodynamic properties described above.

Figure 7:
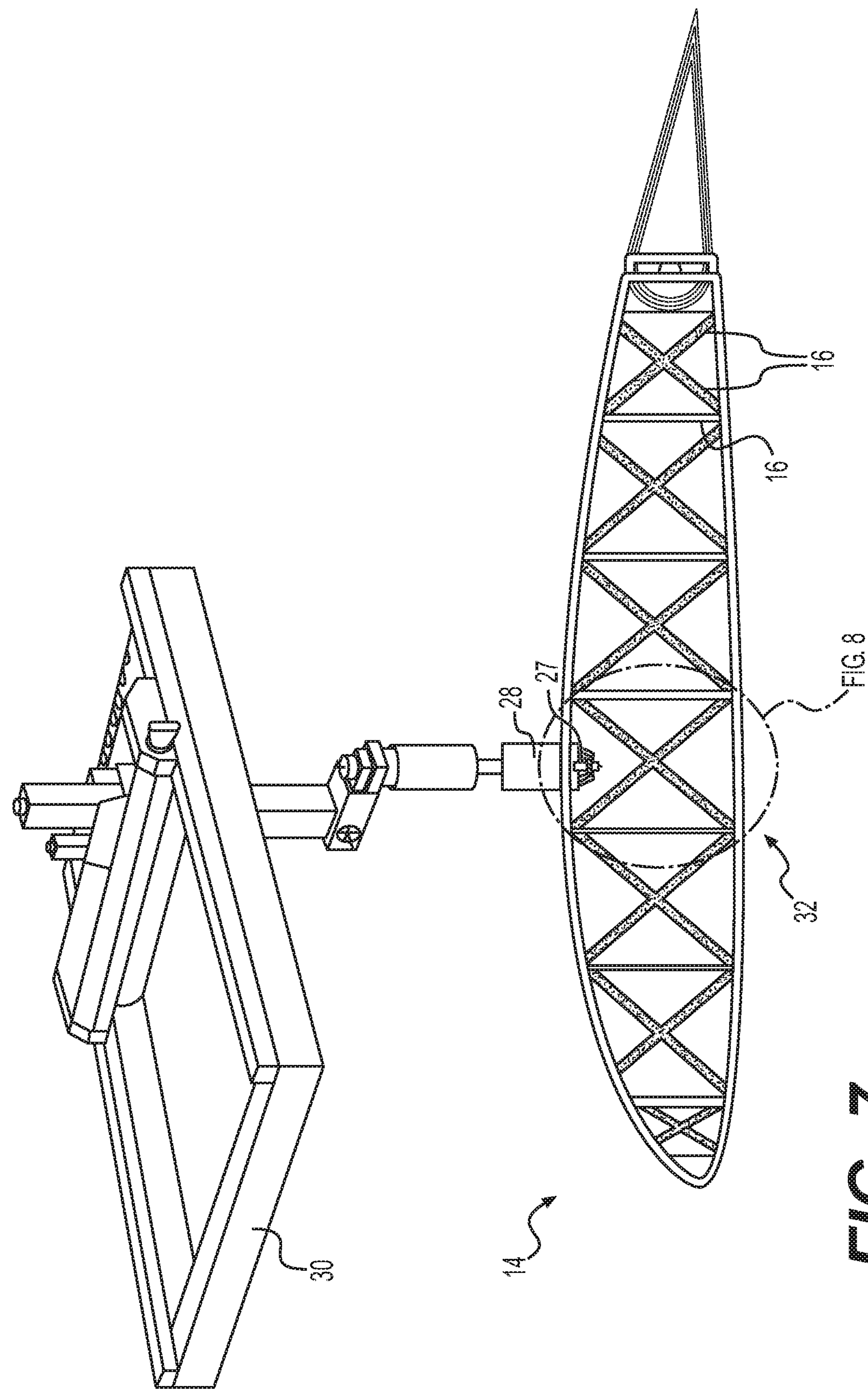
FIGS. 7 and 8 are diagrammatic illustrations of additional exemplary portions of the vehicle body of FIG. 1.

FIG. 7 illustrates an exemplary part 32 of skeleton 16 that may be fabricated through the use of head 28 and support 30. Although depicted and described as a rib of wing 14, part 32 could be another skeletal component of wing 14 and/or fuselage 12. In this example, part 32 includes opposing outer support surfaces 34, opposing internal braces 36, and a plurality of cross-pieces 38 that interconnect support surfaces 34 and/or braces 36. It should be noted that outer support surfaces 34 and/or internal braces 36 could have any desired shape, for example curved, flat, stepped, etc. It is also contemplated that outer support surfaces 34 and internal support surfaces 36 could form one or more continuous surfaces, if desired. For example, one or more of support surfaces 34 could be curved and generally tangential with one or more of braces 36 (e.g., at a leading and/or trailing end of the rib). And although cross-pieces 38 are shown as generally straight and oriented at about 45° relative to support surfaces 34 and braces 36, it is contemplated that cross-pieces 38 could also be curved and/or oriented at another angle. It should be noted that, although seven adjacent and nearly identical parts 32 are shown to make up the disclosed rib, any number of the same or different parts 32 (e.g., only one part 32) may be used for this purpose.

Figure 8:
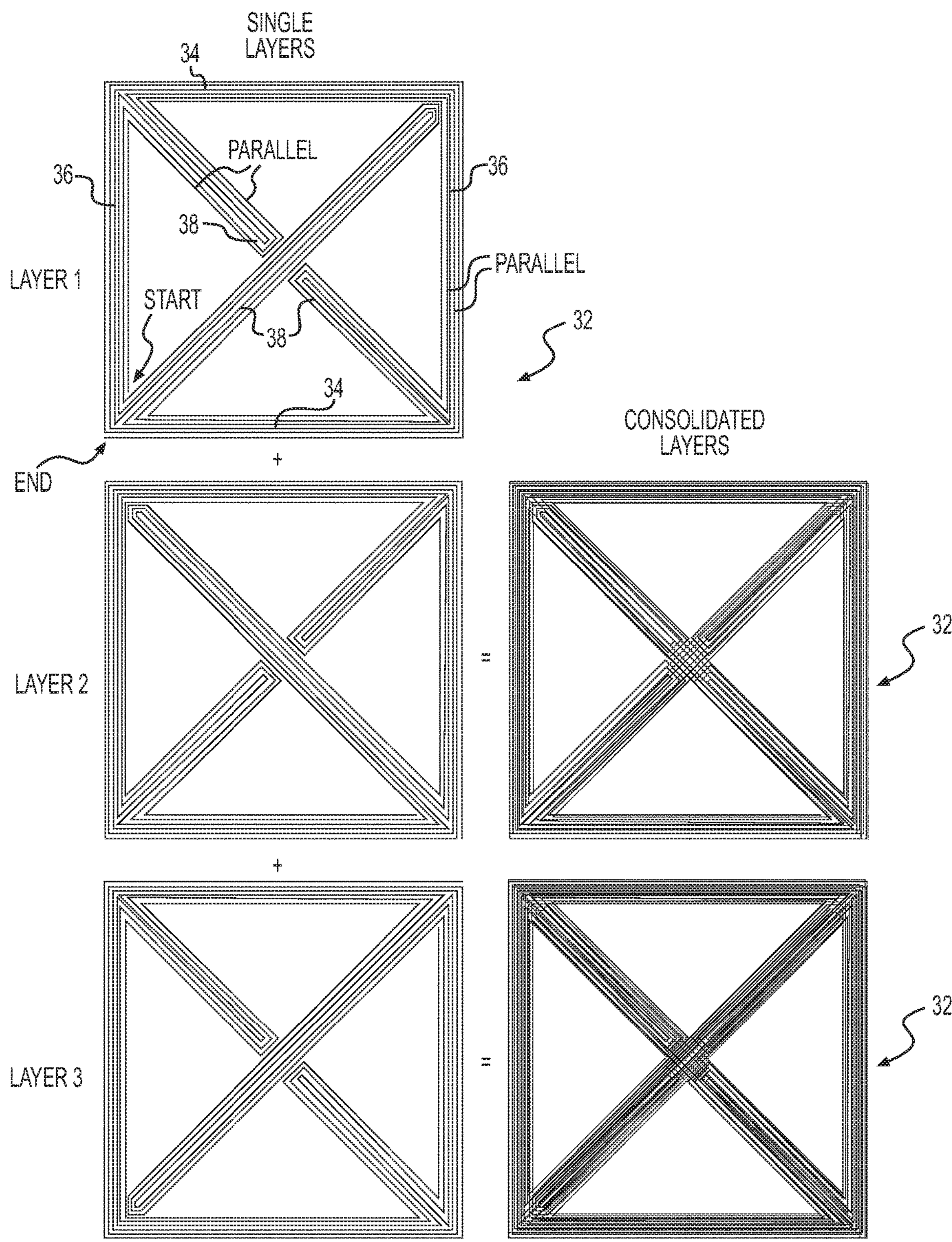

Part 32 may be created following a unique tool path that allows for use of continuous fibers and provides for high-strength in a low-weight configuration. In particular, part 32 may be fabricated using a middle-out strategy. FIG. 8 illustrates use of this strategy during fabrication using multiple different and overlapping layers.

For example, in a first layer, head 28 may be controlled to start discharging and curing one or more continuous resin-coated fibers at a lower-left corner (e.g., adjacent an internal intersection of a lower support surface 34 and a left brace 36), and continue discharging and curing the same resin-coated fiber(s) during travel upward to an adjacent upper-left corner. Head 28 may then move diagonally inward toward a general center of part 32, and then double back prior to reaching the center to move toward the upper-left corner following a generally parallel trajectory. During this doubling-back maneuver, head 28 may be spaced apart a distance from its original trajectory (e.g., spaced more toward the right of part 32), such that an empty space will exist along a diagonal of part 32 and a box shape is formed at internal ends of the diagonal parallel tracks. Head 28 may then move rightward to an upper-right corner of part 32, followed by about a 90° turn downward upon reaching an internal edge of part 32. The same general pattern may be repeated at the lower-right corner of part 32 that was made at the upper-left corner, such that a mirror image across a virtual diagonal dividing line is created. Head 28 may then move leftward and stop short of its starting point, after which head 28 may turn through about 45° clockwise and travel diagonally completely across part 32 to the upper-right corner. Head 28 may then double back toward the lower-left corner along a spaced-apart parallel track, such that head 28 is near its starting point (e.g., radially outward and slightly lower than the starting point). During this doubling-back maneuver, head 28 may be spaced apart a distance from its original trajectory (e.g., spaced more toward the left of part 32), such that an empty space will exist along a diagonal of part 32. As head 28 moves towards the upper-right corner, it may deviate from its trajectory at a turn-around point and head into the corner, such that an arrow-head shape is formed at internal ends of the parallel tracks. The arrow-head shape may bond to the hardened fibers laid down previously at this corner location. The diagonally laid fiber(s) may bond to the box shape previously laid down at the center of part 32. The entire process may be repeated any number of times to add a corresponding number of material tracks to the first layer and thereby increase a cross-sectional area of the first layer. During repetition, part 32 may grow outward and the empty spaces described above as being located between the parallel tracks may be filled in. It should be noted that, during formation of any one layer, the fibers discharging from head 28 may not overlap other fibers such that all fibers are laid down within the same plane. When head 28 reaches an endpoint of a particular layer, the fiber(s) may be cut from head 28, such that head 28 may be repositioned for start of a new layer.

A second layer may be formed directly on top of the first layer, for example by rotating the pattern of the first layer through a desired angle (e.g., through about 90°). By rotating the pattern through about 90°, the fibers extending diagonally completely across part 32 in the second layer may overlap the fibers that doubled back at the center of part 32 in the first layer. This overlapping of different portions of the repeating pattern may help to increase a strength of part 32. It is contemplated that any number of fibers may be deposited at any location and oriented generally normal to the overlapping layers (e.g., fibers $F_n$ like those shown in FIG. 5) to interlock the layers, if desired. Additionally or alternatively, discharged but uncured portions of a previous layer could be wrapped over subsequently formed layers and then cured to improve an interlock strength.

Any number of additional layers may be formed on top of the first two layers in alternating orientations and/or in orientations of incremental rotating angles (e.g., when the angle is not a multiple of 90°). This may continue until a desired thickness of part 32 is achieved. In one example, an entire fuselage 12 and/or wing 14 could be fabricated in this manner. For example, skin 18 could be simultaneously fabricated over part 32 when using the middle-out approach. In particular, an empty space may be created inside of fuselage 12 and/or wing 14 and between adjacent parts 32, by only creating outer portions of supports 34 and/or braces 36.

INDUSTRIAL APPLICABILITY

The disclosed arrangements and designs of skeleton 16 and skin 18 may be used in connection with any type of vehicle body 10. For example, skeleton 16 and skin 18 may be used in connection with an airplane body, a drone body, a car body, a boat body, or any other type of vehicle body where light-weight, low-cost, and high-performance are important. Vehicle body 10 may be light-weight and low-cost due to the reduction in the number of fasteners required to secure skin 18 to skeleton 16 and/or to secure components of vehicle body 10 to each other. In addition, vehicle body 10 may be light-weight do to the use of composite materials used to make both of skeleton 16 and skin 18. The high-performance may be provided in the unique ways that particular fibers and resins are used and laid out within skeleton 16 and skin 18.

It will be apparent to those skilled in the art that various modifications and variations can be made to the disclosed vehicle body. Other embodiments will be apparent to those skilled in the art from consideration of the specification and practice of the disclosed vehicle body. It is intended that the specification and examples be considered as exemplary only, with a true scope being indicated by the following claims and their equivalents.

What is claimed is:

1. A vehicle body, comprising: an internal skeleton fabricated via a first additive manufacturing system; and a skin fabricated in-situ over the internal skeleton via a second additive manufacturing system that is different from the first additive manufacturing system;

wherein the internal skeleton includes a plurality of adjacent hollow tubes;

wherein the internal skeleton and the skin together form a wing shape;

wherein the plurality of adjacent hollow tubes extend in a length direction of the wing shape;

wherein the plurality of adjacent hollow tubes are fabricated from a matrix material and a plurality of continuous fibers encased within the matrix material;

wherein the skin is fabricated from a matrix material and a plurality of continuous fibers encased within the matrix material; and wherein at least some of the plurality of continuous fibers of the internal skeleton extend into and form a portion of the skin.

2. The vehicle body of claim 1, wherein the plurality of continuous fibers of at least one of the internal skeleton and the skin are in tension.

3. The vehicle body of claim 1, wherein the plurality of continuous fibers of at least one of the internal skeleton and the skin are oriented in a plurality of different directions.

4. The vehicle body of claim 1, wherein the plurality of continuous fibers of at least one of the internal skeleton and the skin have trajectories that curve in at least two dimensions.

5. The vehicle body of claim 4, wherein the plurality of continuous fibers are organically arranged within the skin.

6. The vehicle body of claim 5, wherein the plurality of continuous fibers in the skin extend from a base end near a fore/aft center of the wing shape toward a tip end at leading and trailing edges of the wing shape.

7. The vehicle body of claim 6, wherein a density of the plurality of continuous fibers in the skin varies along a length of the wing shape.

8. The vehicle body of claim 7, wherein a density of the plurality of continuous fibers in the skin is greater at the base end than at the tip end.

9. The vehicle body of claim 1, wherein the matrix material of both the internal skeleton and the skin includes a UV-cured resin.

10. The vehicle body of claim 1, wherein the plurality of continuous fibers of at least one of the internal skeleton and the skin includes at least one of an electrically conductive wire, a shape memory fiber or a fiber optic coated with at least one of an insulation layer and a strength-enhancing layer.

11. The vehicle body of claim 1, wherein:

the internal skeleton and the skin together also form a fuselage shape; and the plurality of continuous fibers in the skin extend from the wing shape into the fuselage shape.

12. The vehicle body of claim 1, wherein at least one of the plurality of adjacent hollow tubes is coated to function as at least one of a fuel tank and a fuel passage.

13. A vehicle body having a wing and a fuselage, comprising:

an internal skeleton fabricated via a first additive manufacturing system and having a plurality of adjacent hollow tubes extending in a length direction of the wing and being formed from a plurality of continuous fibers coated with a matrix; and a skin fabricated in-situ over the internal skeleton via a second additive manufacturing system that is different from the first additive manufacturing system, the skin having a plurality of continuous fibers coated with a matrix and laid over the internal skeleton;

wherein the plurality of continuous fibers of both the internal skeleton and the skin are in tension;

wherein at least one of the plurality of adjacent hollow tubes is coated to function as at least one of a fuel tank and a fuel passage;

wherein the internal skeleton and the skin together form a wing shape; and wherein at least some of the plurality of continuous fibers of the internal skeleton extend into and form a portion of the skin.

14. A method of fabricating a vehicle body, comprising:

providing the vehicle body of claim 1 by implementing a first additive manufacturing technique to fabricate an internal skeleton from continuous fibers coated with a matrix; and implementing a second additive manufacturing technique to fabricate a skin over the internal skeleton from continuous fibers coated with a matrix.

15. The method of claim 14, wherein implementing the first additive manufacturing technique to fabricate the internal skeleton includes implementing the first additive manufacturing technique to fabricate a plurality of adjacent hollow tubes.

* * * * *